US008619703B2

(12) United States Patent  
Tsubota (10) Patent No.: US 8,619,703 B2  
(45) Date of Patent: Dec. 31, 2013

(54) ACCESS POINT DEVICE AND A COMMUNICATIONS SYSTEM FOR EFFECTIVELY USING A PROXY ARP FUNCTION

(75) Inventor: Azuma Tsubota, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1118 days.

(21) Appl. No.: 11/545,689

(22) Filed: Oct. 11, 2006

(65) Prior Publication Data

US 2007/0097919 A1    May 3, 2007

(30) Foreign Application Priority Data

Oct. 28, 2005 (JP) ................................. 2005-314810

(51) Int. Cl.
  *H04W 4/00* (2009.01)
  *H04W 36/00* (2009.01)

(52) U.S. Cl.
  USPC ........... 370/331; 370/328; 370/338; 455/436; 455/432.3

(58) Field of Classification Search
  USPC .............................. 455/436–445, 432.1–436; 370/328–338, 401; 726/12
  See application file for complete search history.

(56) References Cited

U.S. PATENT DOCUMENTS

| 6,490,259 | B1 * | 12/2002 | Agrawal et al. ............... 370/331 |
| 6,879,830 | B1 * | 4/2005 | Vollmer et al. ............... 455/442 |
| 2004/0054799 | A1 * | 3/2004 | Meier et al. ................... 709/230 |
| 2004/0114559 | A1 * | 6/2004 | Wang ............................. 370/338 |
| 2004/0190477 | A1 * | 9/2004 | Olson et al. ................... 370/338 |

FOREIGN PATENT DOCUMENTS

| JP | 2002-541686 T | 12/2002 |
| JP | 2004-229225 | 8/2004 |
| JP | 2004-304570 A | 10/2004 |
| WO | WO-00/48363 A1 | 8/2000 |
| WO | WO 2004/077747 A1 * | 9/2004 ............. H04L 12/28 |

* cited by examiner

*Primary Examiner* — Christopher M Brandt
(74) *Attorney, Agent, or Firm* — Rabin & Berdo, P.C.

(57) ABSTRACT

In an access point device, a controller controls a wired interface communicating on wire with a network switcher accommodating access point devices and a wireless interface communicating wirelessly with a wireless terminal device located in its service area. Services are handed over between the access point devices responsively to the wireless terminal device moving. Access point devices before and after the handover of services are defined as a handover source and a hand over destination, respectively. A hand over at the hand over destination causes a data frame to be generated containing the MAC address of the wireless terminal device as a source address, a broadcast address as a destination address and address information of its own device. A table holds terminal connection information defining the relationship of the MAC address to the IP address of the wireless terminal device. The data frame is transmitted to the network switcher through the wired interface.

6 Claims, 6 Drawing Sheets

ACCESS POINT DEVICE AND A COMMUNICATIONS SYSTEM FOR EFFECTIVELY USING A PROXY ARP FUNCTION

BACKGROUND OF THE INVENTION

1. Field of the Invention

The present invention relates to an access point device and a communications system, and is applicable, for example, to a method of updating terminal connection information held in a network switcher according to a handover process that is performed between access point devices.

2. Description of the Background Art

A description will be given of a conventional method in which a wireless VoIP (Voice over Internet Protocol) terminal is handed over on a wireless local area network (LAN). A plurality of access point devices are connected to some of the ports of a network switcher, one of the remaining ports being connected to an external network through a router. Note that the external network has external terminal devices connected thereto. The access point devices each has a wired-LAN interface, a controller, and a wireless LAN interface. A wireless LAN terminal device is connected to any access point device and communicates with that device.

If the wireless LAN terminal device connected to one access point device moves during communication and enters the administration area of another access point device, the wireless LAN terminal device is handed over from the previous access point device to the next access point device to be reconnected to the next access point device.

Such a handover technique between access point devices is disclosed in Japanese patent laid-open publication No. 2004-229225 by way of example.

When a wireless LAN terminal device is moving during communication and the handover process is being executed between access point devices, a frame is sometimes transferred from an external terminal device to this wireless LAN terminal device. At this time, a MAC (Media Access Control) address table in the network switcher has not been updated yet. The MAC address table defines the relationship of the MAC address of a wireless LAN terminal device with a corresponding switcher port number, etc. Because of the MAC address table not updated, there may be cases where the relay of a frame to the wireless LAN terminal device is unsuccessful.

As a technique for avoiding such a case, there has been proposed a method in which the next access point device receiving a reconnection request after movement of a wireless LAN terminal device transmits a dummy data frame in which the MAC address of the wireless LAN terminal device is inserted in its destination address field, and a network switcher receiving the dummy data frame updates the connection information in its MAC address table that corresponds to the wireless LAN terminal device. In addition, for example, some conventional access point devices are equipped with a proxy address resolution protocol (ARP) function which, when receiving an ARP request for the IP (Internet Protocol) address of a destination LAN terminal device to be relayed by its own device, replies to the ARP request by proxy, in order to reduce the necessity to transmit the ARP request to the wireless LAN terminal device to be connected and reduce the power consumption of the wireless LAN terminal device.

However, in the case of adopting the above-described method in which the next access point device connected after movement of the wireless LAN terminal device transmits a dummy data frame to the network switcher, there arises a problem that this access point device has to transmit the unnecessary data frame.

In the case of utilizing the above-mentioned proxy ARP function equipped in the access point device, the access point device normally cannot use the proxy ARP function until it receives an IP packet from the wireless LAN terminal device connected thereto.

Therefore, even if frames are transmitted from an external terminal device to the wireless LAN terminal device, in the access point device the proxy ARP function cannot be executed until it receives an IP packet from the wireless LAN terminal device and identifies the IP address of the wireless LAN terminal device, and consequently, there will arise another problem that frames cannot be relayed.

In addition, the handover source, that is, the previous access point device continues to have the proxy ARP function of the wireless LAN terminal device which is no longer located within its administration area. Because of this, the previous access point device sometimes replies to an ARP request. This replay gives rise to ARP inconsistency, whereby there is a possibility that trouble will occur in the operation of the entire network.

SUMMARY OF THE INVENTION

It is an object of the present invention to provide an access point device and a communications system that are capable of effectively using the proxy ARP function, and that are capable of updating the connection information of a wireless LAN terminal device in a network switcher immediately after the wireless LAN terminal device is handed over, without causing network trouble.

In accordance with the present invention, there is provided an access point device connectible with a wireless terminal device. The access point device comprises a wired interface for establishing wired communication with a network switcher that is connected with or accommodates a plurality of access point devices, including the access point device, and a wireless interface for establishing wireless communication with the wireless terminal device located within its service area. The access point device also comprises a controller comprising a generation functional block responsive to a handover at the handover destination for generating a data frame so that it contains physical address information of the wireless terminal device as a source address, a broadcast address as a destination address and address information of its own device, where the handover is defined as handing services over between the access point devices in response to the wireless terminal device moving, the handover source is defined as an access point device before the handover of the services, and the handover destination is defined as an access point device after the handover of the services. The access point device further comprises a table for holding terminal connection information in which the physical address information is related to network address information of the wireless terminal device. The controller transmits the generated data frame to the network switcher through the wired interface.

According to the access point device and communications system of the present invention, under the control of the controller the access point device of the handover destination sends to the network switcher a data frame which contains the network address information of the wireless terminal device as a source. Therefore, immediately after the wireless terminal device has been handed over, the network switcher is able to update the connection information of the wireless terminal device.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
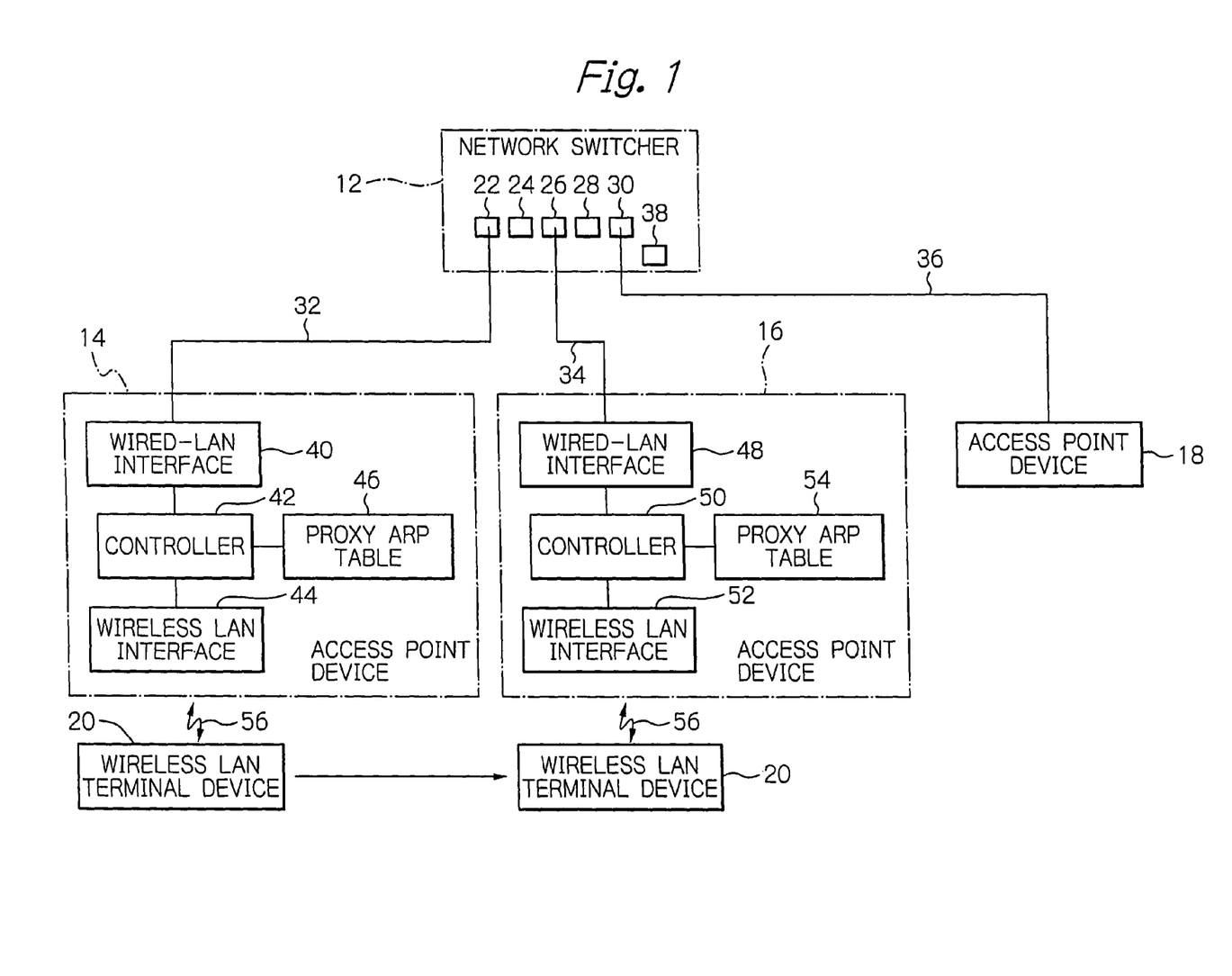
FIG. 1 is a schematic block diagram showing the configuration of a preferred embodiment of a wireless communications system to which the present invention is applied.

Embodiments of a communications system according to the present invention will be described in detail with reference to the accompanying drawings. Referring to FIG. 1, there is shown a wireless communications system 10 constructed in accordance with a preferred embodiment of the communications system of the present invention. In the wireless communications system 10, under the control of a controller 50 an access point device 16 of a handover destination sends to a network switcher 12 a request frame in which the IP (Internet Protocol) address of a wireless terminal device 20 is a source address, whereby the connection information of the wireless terminal device 20 in the network switcher 12 can be updated immediately after the wireless terminal device 20 has been handed over to the access point device 16.

In the preferred embodiment, the communications system of the present invention is applied to the wireless communications system 10. In the figures, part of the circuitry not directly relevant to the understanding of the present invention is not shown, and detailed description thereof will not be made in order to avoid redundancy. In the following description, signals are designated with reference numeral indicating connections on which signals are transmitted.

As shown in FIG. 1, the wireless communications system 10 comprises a network switcher 12, a plurality of access point devices 14, 16, and 18, and a wireless local area network (LAN) terminal device 20. The network switcher 12 has the function of switching a MAC (Media Access Control) frame of the wireless LAN terminal device 20 based on the MAC address and transferring the MAC frame to its destination. In the preferred embodiment, the network switcher 12 has five physical ports 22, 24, 26, 28, and 30. The physical port 22 of the network switcher 12 is connected to, or accommodates, the access point device 14 by a signal line 32, the physical port 26 is connected to the access point device 16 by a signal line 34, and the physical port 30 is connected to the access point device 18 by a signal line 36.

If the access point devices 14, 16, and 18 respectively connected with the ports of the network switcher 12 may be identical with one another in construction, the access point devices 14, 16, and 18 form the same broadcast domain. The wireless communications system 10 establishes broadcast communications by forming this domain.

The network switcher 12, as with switchers having a general function of transmitting and receiving information, has an MAC address table 38 in which the MAC addresses of the wireless LAN terminal device 20, etc., transmitted and received by its own device 12 are related with the port numbers, device identification of the access point device 18, etc. The MAC address table 38 updates stored contents as needed according to a change in the state of connections, etc. The network switcher 12 is able to connect with an external network through a router, etc., and may relay data between an external terminal device on the external network and the wireless LAN terminal device 20 on the wireless LAN.

Note that the network switcher 12 may be an existing network switcher. Because the internal construction of the network switcher 12 does not form part of the present invention, a description of the internal configuration will not be given.

The access point devices 14, 16, and 18 each have an administration or service area, and administer communication between the wireless LAN terminal device 20 located within this area and a destination terminal device on a wired LAN. The access point devices 14, 16 and 18 have the function of relaying MAC frames received. The access point devices 14, 16, and 18 each include the same components. Particularly, the components comprised in the access point devices 14 and 16 are shown in FIG. 1. The access point device 14 includes a wired-LAN interface 40, a controller 42, a wireless LAN interface 44, and a proxy ARP table 46, which are interconnected as illustrated. The access point device 16 comprises a wired-LAN interface 48, a controller 50, a wireless LAN interface 52, and a proxy ARP table 54, which are interconnected as illustrated. The access point device 18 likewise comprises a wired-LAN interface, a controller, a wireless LAN interface, and a proxy ARP table, although not shown.

Now, the major components of the access point device 14 will be described. The wired-LAN interface 40 has the function of interfacing with a wired LAN. The wired LAN in the preferred embodiment is constructed to establish communication according to Ethernet (trademark) standards. The wired-LAN interface 40 communicates with the controller 42.

Figure 2:
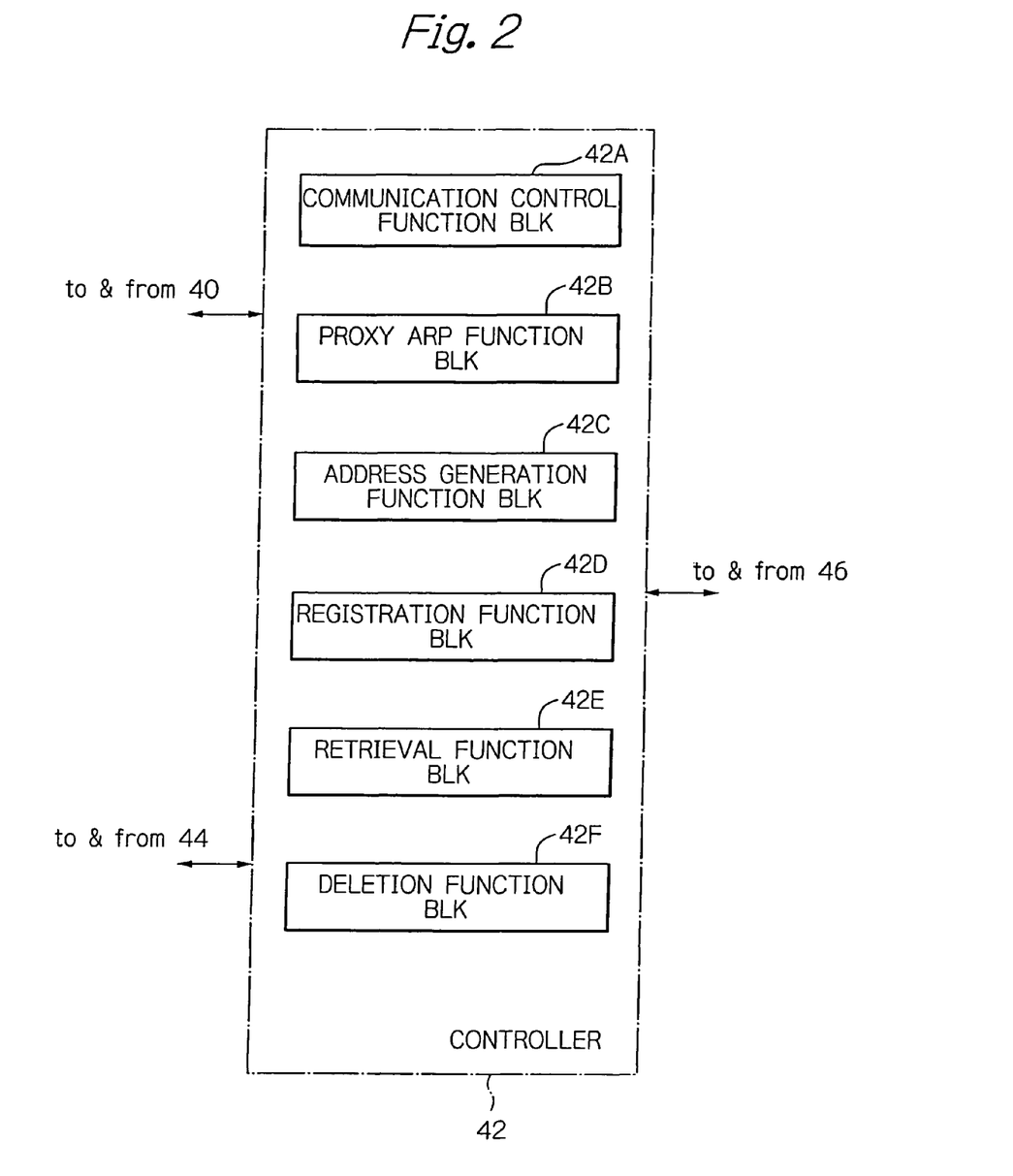
FIG. 2 is a schematic block diagram showing the functions of the controller of the wireless communications system shown in FIG. 1.

As shown in FIG. 2, the controller 42 includes a communication control functional block 42A, a proxy address resolution protocol (ARP) functional block 42B, an address generation functional block 42C, a registration functional block 42D, a retrieval functional block 42E, and a deletion functional block 42F. The communication control functional block 42A has a function which, according to a result of being contained or listed in the proxy ARP table 54 of the handover destination, sets the corresponding data of the table 54 so that the wireless terminal device 20 is a destination, and transmits the set data frame to the handover source, and which, according to a result of not being contained in the proxy ARP table 54, discards the supplied data frame. The communication control functional block 42A not only has the function of controlling wire and wireless communications in the access point device 14 mutually, but also controls transmission and reception, discarding of data, as described above.

The replay function, the proxy ARP functional block 42B, of the controller 42 has a function which, in response to the transmission of a data frame from the access point device 16 of the handover destination to the access point device 14 of the handover source, sends a request for the MAC address of the wireless terminal device 20 from the handover source to the access point device 16 of the handover destination having an IP address, references information stored in the proxy ARP table 54 in response to this request with the access point device 16 of the handover destination, and sends back the MAC address of the wireless terminal device 20 to the handover source. The address generation functional block 42C has the function of generating a data frame which contains the MAC address of the wireless LAN terminal device 20 inserted in the source address field, a broadcast address inserted in the destination address field, and its own address.

The registration functional block 42D has the function of receiving a data frame at a handover destination, and adding and registering the received data. Specifically, the registration functional block 42D is the function of registering the generated MAC address and broadcast address in the proxy ARP table 46 as a set of data related to each other.

The retrieval functional block 42E has the function which, in response to reception of a data frame generated, retrieves whether the MAC address in the source address field contained in the received data frame is contained in the proxy ARP table. That data frame is referred to as a proxy ARP request frame. More specifically, if the wireless LAN terminal device 20 moves from the side of the access point device 14 to the side of the access point device 16 of the handover destination, and the access point device 16 recognizes a connection with the wireless LAN terminal device 20, a data frame is made so that the MAC address of the wireless LAN terminal device 20 is inserted in the source address and a broadcast address is inserted in the destination address field. The data frame thus made is broadcast to all ports, i.e. all access point devices.

In the case where the wireless LAN terminal device 20 is not in radio communications with the access point device 14, the controller 42 receives a proxy ARP request frame through the network switcher 12. The controller 42 determines by the retrieval functional block 42E whether or not data corresponding to the MAC address, inserted in the source address field, in the proxy ARP request frame is present in the proxy ARP table 46. The corresponding data is referred to as proxy ARP data. When the corresponding data is present in the proxy ARP table 46, the controller 42 sends back the corresponding proxy ARP data by the proxy ARP functional block 42B.

The deletion functional block 42F implements a function which, when a reply is received at a handover source, determines that the wireless terminal device 20 is in connection with a handover destination, and deletes information stored in the proxy ARP table which corresponds to information whose completion of registration has been confirmed. If completion of registration is confirmed, it is determined that the handover is successful, and the controller 42 deletes the corresponding information which is old in the proxy ARP table 46 of the handover source.

The proxy ARP table 46 is memory, and is constructed to store proxy ARP data in which the MAC address in the source address field of the IP packet of the wireless LAN terminal device 20 in radio communication therewith is related to the IP address. Specifically, the proxy ARP table 46 stores a plurality of combined data in which an MAC address and a broadcast address are related to each other. In the proxy ARP table 46, registration, retrieval, and deletion of data are controlled by the controller 42. The wireless LAN interface 44 has the function of interfacing with a wireless LAN including wireless LAN terminal devices, or interfacing with radio 56.

The wireless LAN terminal device 20 is a communication terminal device that enables a wireless network communication function. The wireless LAN terminal device 20 is connectable with the access point device 14, for example, in an infrastructure mode of the networking method supported by the Institute of Electrical and Electronics Engineers (IEEE) 820.11 standard. The wireless LAN terminal device 20 can employ various terminal devices according to the manners in which wireless network communication is utilized. For instance, as a fixed terminal device, the wireless LAN terminal device 20 can employ a personal computer with a LAN board compatible with a wireless LAN function, a mobile IP telephone, wireless IP telephones including a soft phone, and so on.

It is to be noted that the wireless LAN terminal device 20 may be an existing terminal device. Because the internal configuration of the wireless LAN terminal device 20 does not form part of the present invention, a description of the internal construction will not be given.

Figure 3:
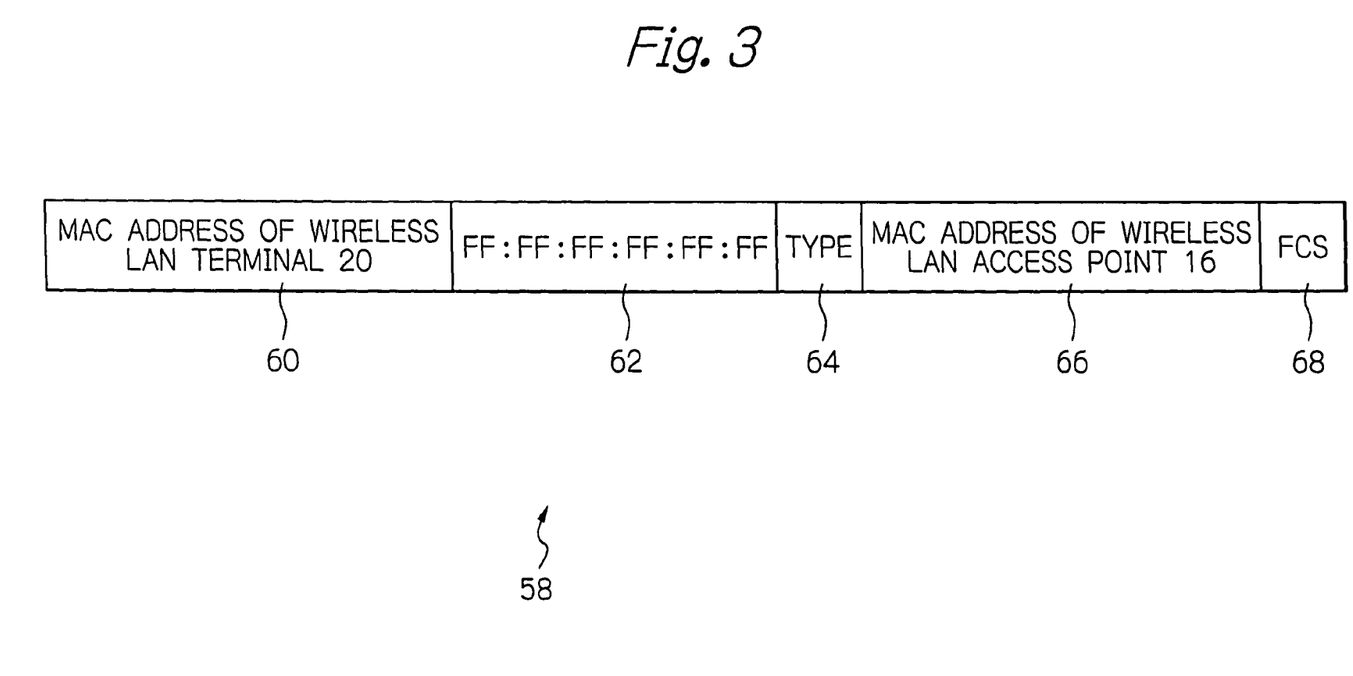
FIG. 3 schematically show the fields of a proxy ARP request frame handled by the wireless communications system shown in FIG. 1.

Referring now to FIG. 3, there is exemplarily shown a proxy ARP request frame 58. The proxy ARP request frame 58 contains a source address field 60, a destination address field 62, a type field 64, a handover destination MAC address field 66, and a frame check sequence (FCS) field 68. Specifically, the source address field 60 includes the MAC address of the wireless LAN terminal device 20. The destination address filed 62 includes a broadcast address (FF.FF.FF.FF.FF.FF in hexadecimal expression). In the type field 64, information representing data type is stored. In the handover destination MAC address field 66, the MAC address of the access point device 16 is stored.

Next, the operation after the handover in response to the wireless LAN terminal device 20 moving in the wireless communications system 10 will be described with reference to FIG. 4.

The wireless LAN terminal device 20 in radio communication with the access point device 14 moves into the administration area of the access point device 16 during communication. At this time, after the handover, the wireless LAN terminal device 20 sends a request for reconnection to the access point device 16 at time T10 (CONNECTED$_{13}$REQ 70). This connects the wireless LAN terminal device 20 to the access point device 16.

Based on the information of the wireless LAN terminal device 20 handed over, the controller 50 in the access point device 16 generates a proxy ARP request frame in which the MAC address of the wireless LAN terminal device 20 is inserted in the source address field and a broadcast address is inserted in the destination address field. The access point device 16 transmits the proxy ARP request frame to the network switcher 12 through the wired-LAN interface 48 at time T12 (PROXY_ARP_REQ 72).

The network switcher 12 receives the proxy ARP request frame in which the source address field is the MAC address of the wireless LAN terminal device 20, through its physical port 26. From this, the network switcher 12 recognizes that the wireless LAN terminal device 20 has been connected to the access point device 16. In response to this recognition, at time T14 the network switcher 12 updates the MAC address table 38 so that the physical port of the wireless LAN terminal device 20 is changed (UPDATE 74). In this manner, the physical port is replaced.

Next, the network switcher 12 sends the received proxy ARP request frame to all ports (all access point devices) (SEND 76). The access point devices 14 and 18 each receive the proxy ARP request frame and, based on the source address field in the proxy ARP request frame, reference the proxy ARP table 46 and proxy ARP table, not shown. The access point devices 14 and 18 each confirm the presence or absence of proxy ARP data that corresponds to the MAC address of the wireless LAN terminal device 20.

In the access point device 14, the proxy ARP data of the wireless LAN terminal device 20 is present because it is the handover source. In this case, the access point device 14 makes a data frame in which the destination address field is the access point device 16 and which contains the proxy ARP data of the wireless LAN terminal device 20, and transmits the data frame to the network switcher 12 through its wired-LAN interface 40 at time T18 (PROXY_ARP_DAT 78). On the other hand, in the access point device 18, when the proxy ARP data of the wireless LAN terminal device 20 is not present, the received proxy ARP request frame is discarded.

The network switcher 12 receives the data frame having proxy ARP data 78 from the access point device 14. Based on the destination address in the received data frame, the network switcher 12 transmits this data frame to the access point device 16 at time T20 (PROXY_ARP_DAT 80).

The controller 50 in the access point device 16 receives proxy ARP data 80 and appends it to the proxy ARP table 54 at time T22 (APPEND 82). After the network switcher 12 has transmitted the proxy ARP data 80 to the access point device 16, the controller 42 in the access point device 14 transmits an ARP request 84 to the network switcher 12 through the wired-LAN interface 40 at time T24 (ARP_REQ 84). The ARP request 84 to be generated in the controller 42 is generated using the proxy ARP function. The ARP request 84 is one which requests an MAC address corresponding to the IP address of the transmitted proxy ARP data 78.

Figure 5:
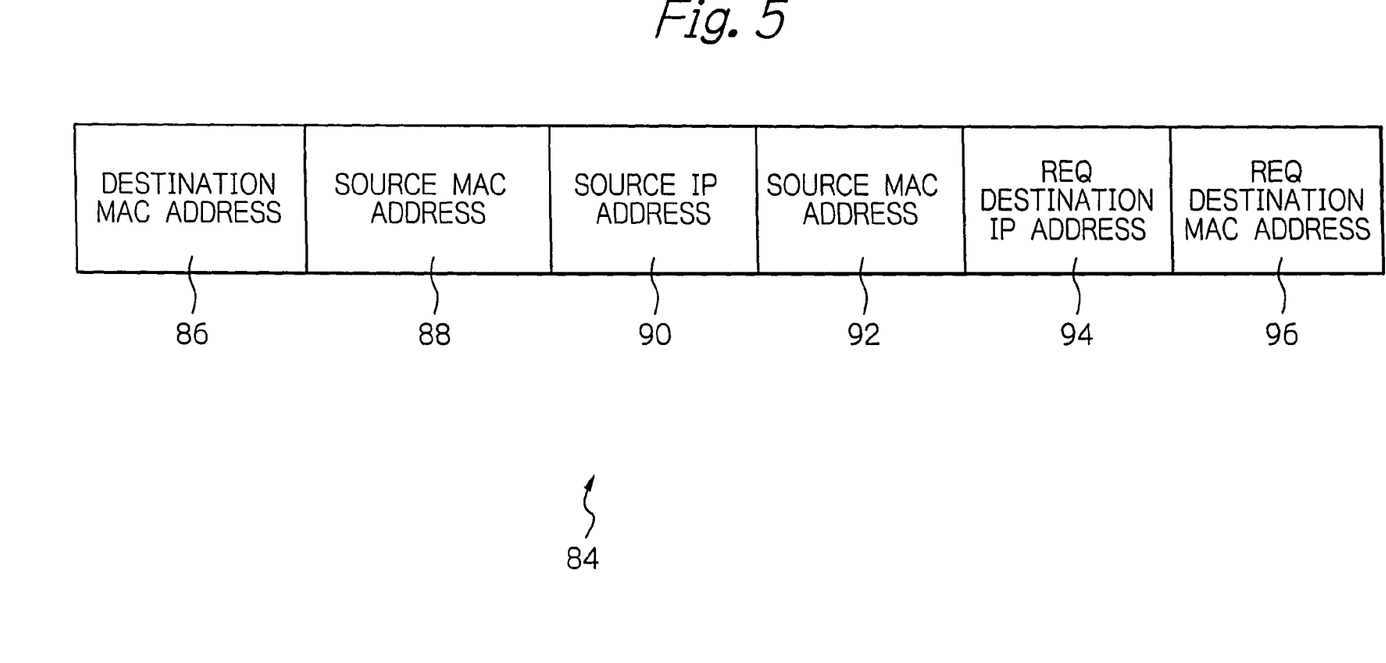
FIG. 5 schematically illustrates the frame structure of an ARP request handled in the operation of FIG. 3.

Referring now to FIG. 5, there is shown an ARP request 84. The ARP request 84 contains a destination MAC address field 86, a source MAC address field 88, a source IP address field 90, a source MAC address field 92, a request destination IP address field 94, and a request destination MAC address field 96. These address fields are the same as general address fields. In the preferred embodiment, the destination MAC address 86 is set to a broadcast address (FF.FF.FF.FF.FF), the source MAC address 88 to the MAC address of the access point device 14, the source IP address 90 to the IP address of the access point device 14, the source MAC address 92 to the MAC address of the access point device 14, the request destination IP address 94 to the IP address of the wireless LAN terminal device 20, and the request destination MAC address 96 to zeros.

Figure 4:
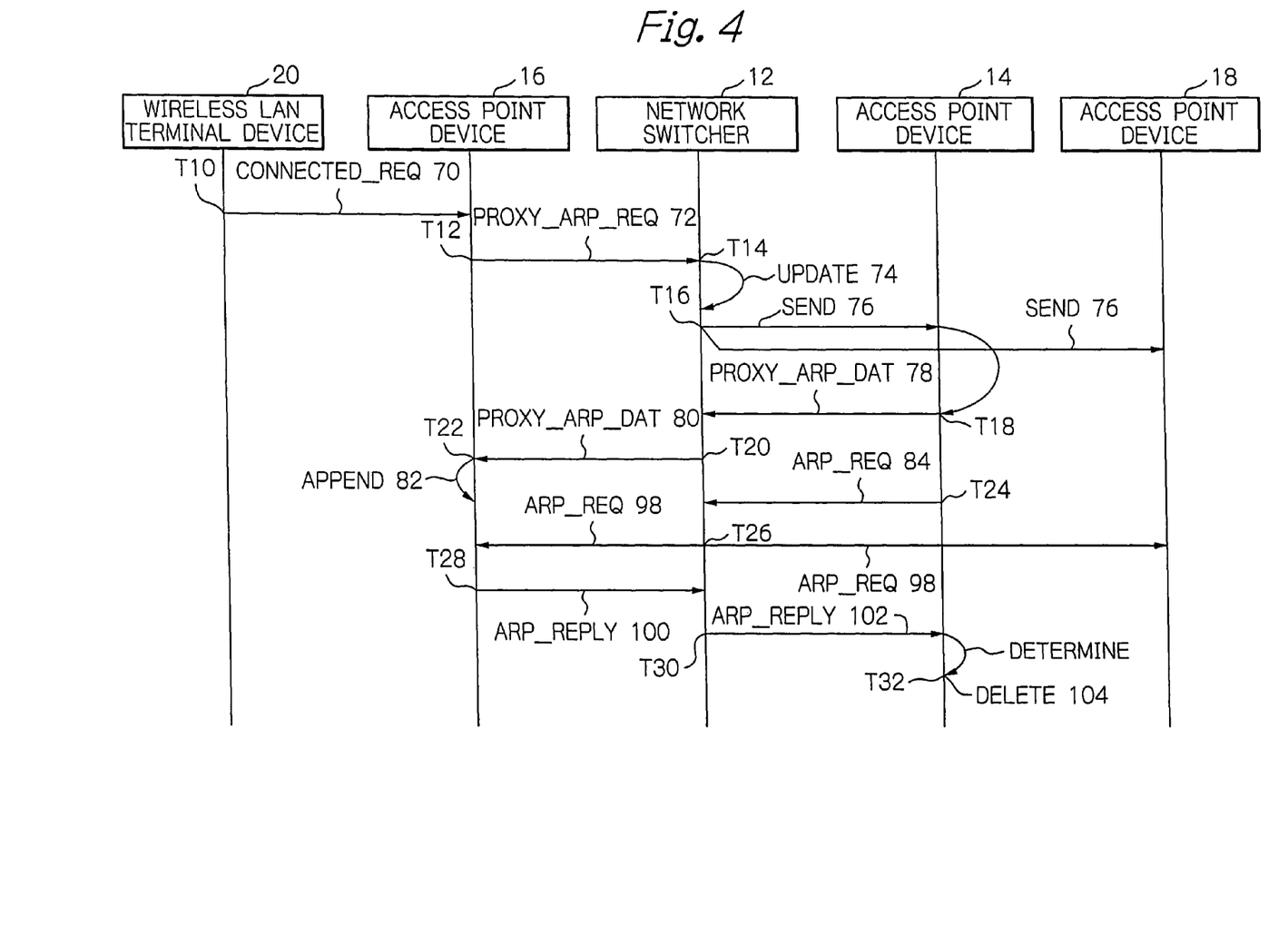
FIG. 4 is a sequence chart showing how the wireless communications system shown in FIG. 1 is operated.

Returning FIG. 4, after receiving the ARP request 84 from the access point device 14, the network switcher 12 transmits the received ARP request 84 to all ports (access point devices) as an ARP request 98 at time T26 (ARP_REQ 98). In response to the ARP request from the access point device 14, the controller 50 in the access point device 16 generates an ARP reply using the proxy ARP function and transmits the generated ARP reply 100 to the network switcher 12 through its wired-LAN interface 48 at time T28 (ARP_REPLY 100). The ARP reply 100 is a packet which carries the MAC address of the wireless LAN terminal device 20 and in which the destination address is the access point device 14.

After receiving the ARP reply 100 from the access point device 16, the network switcher 12 transmits it to the access point device 14 as an ARP reply 102 at time T 30, based on the destination address in the packet (ARP_REPLY 102). After receiving the ARP reply 102 supplied from the access point device 16, the controller 42 in the access point device 14 determines that the handover of the proxy ARP data in the access point device 16 is successful (DETERMINE). When the handover is successful on the basis of the determination, the controller 42 deletes that proxy ARP data stored in the proxy ARP table 46 at time T32 (DELETE 104).

According to the system configuration described above, immediately after the wireless LAN terminal device 20 has been handed over, if the access point device 16 transmits to the network switcher 12 a data frame in which the MAC address of the wireless LAN terminal device 20 is inserted in the source address field and a broadcast address is inserted in the destination address field, the MAC address table 38 of the network switcher 12 can be updated. This makes it possible to correctly relay a data frame addressed to the wireless LAN terminal device 20 received immediately after it has been handed over.

According to the preferred embodiment, the access point device 14 of the handover source can send back proxy ARP data in response to a proxy ARP frame received, and the access point device 16 of the handover destination can register the proxy ARP data received. More specifically, in the prior art, the access point device 16 could not execute the proxy ARP function unless it receives an IP packet from the wireless LAN terminal device 20 in radio communication therewith. According to the present invention, however, the access point device 16 is able to operate the proxy ARP function even when it does not receive an IP packet from the wireless LAN terminal device 20.

Furthermore, the access point device 14 of the handover source confirms the movement of proxy ARP data to the handover destination using the proxy ARP function, and deletes old proxy ARP data. This can prevent the proxy ARP function from operating in the access point device 14, resulting in the prevention of a network malfunction due to the malfunction of the proxy ARP function.

Figure 6:
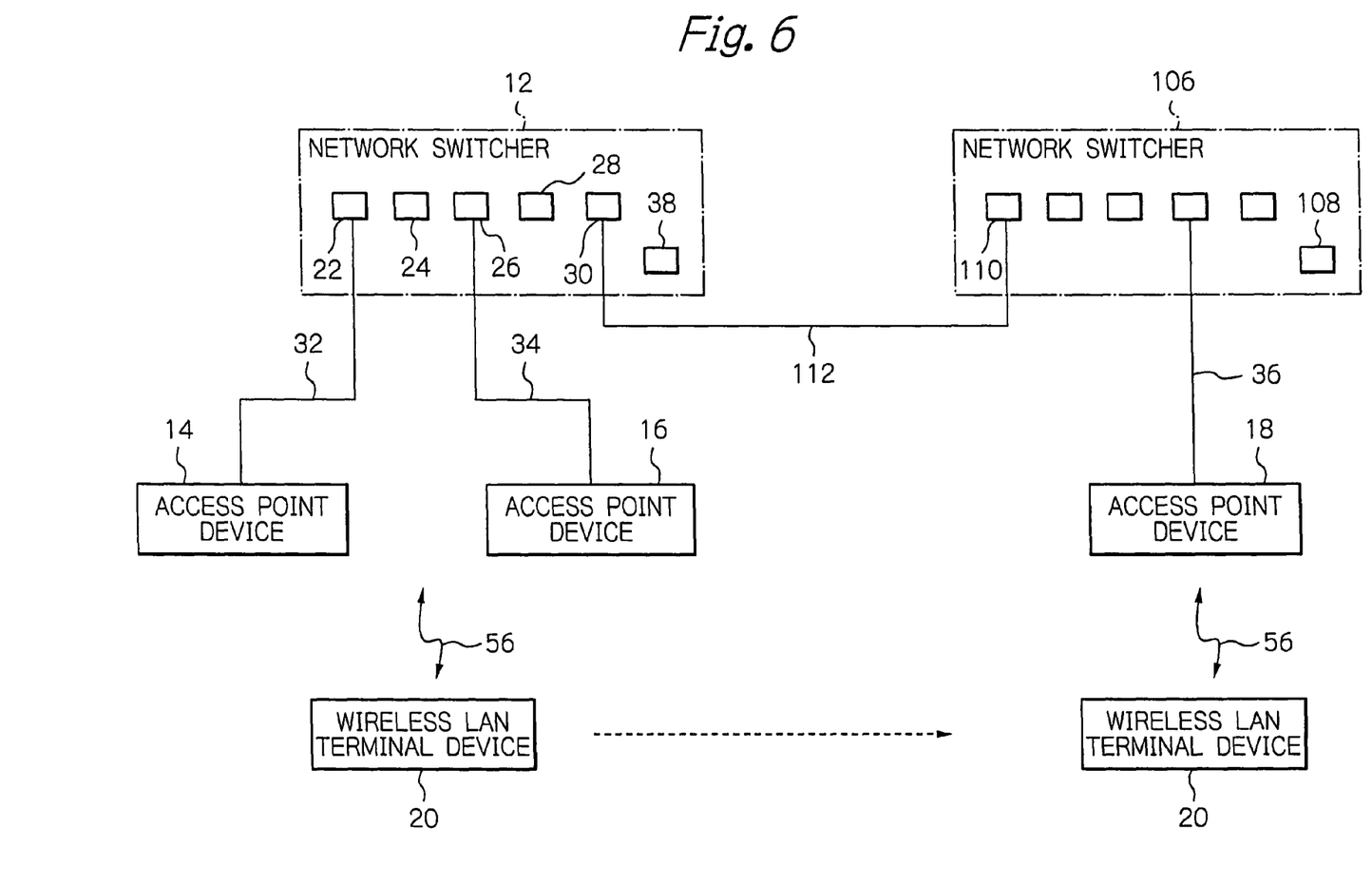
FIG. 6 is a schematic block diagram showing the configuration of an alternative embodiment of the wireless communications system to which the present invention is applied.

While the preferred embodiment is applied to the LAN which includes the network switcher 12 of one stage, the present invention is also applicable to a LAN which includes network switchers of multiple stages, as shown in FIG. 6. For example, even in the case of a multiple-stage configuration comprising a first stage network switcher 12 and a second stage network switcher 106, a data frame in which a broadcast address is incorporated in the destination address field is transmitted, so that MAC address tables 38 and 108 in all the network switchers 12 and 106 can be updated. In the multiple-stage configuration, the physical port 30 of the first stage network switcher 12 and the physical port 110 of the second stage network switcher 106 are connected together by a signal line 112.

While the present invention has been described with reference to the particular illustrative embodiments, the invention is not to be restricted to the embodiments. For example, the number of network switchers, the number of network switcher ports, the number of access point devices, and the number of wireless LAN terminal devices in the communications system of the present invention are not limited to the embodiments.

The entire disclosure of Japanese patent application No. 2005-314810 filed on Oct. 28, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communications system comprising:
   a network switcher for communicating with a wireless terminal device of a mobile unit; and
   a plurality of access point (AP) devices, each AP device including
   a transceiver for communicating with other AP devices through the network switcher,
   a wireless interface for communicating with the terminal device over a radio channel,
   a table for storing connection information of the terminal device, the connection information including physical address information and network address information of the terminal device, and
   a controller for controlling transmission and reception, and storing in and deleting from the table the connection information of the terminal device, wherein the terminal device is configured to hand over from a source AP device to a destination AP device, among the plurality of AP devices,
   wherein
   when the terminal device hands over from the source AP device to the destination AP device, the destination AP device is configured to transmit physical address information of the terminal device to the source AP device, the source AP device is configured to receive the physical address information, look up, in response to the received physical address information, the table of the source AP device with the received physical address information and then send back to the destination AP device physical and network address information of the terminal device, which is stored in the table of the source AP device,
   when the destination AP device receives from the source AP device the physical and network address information of the terminal device, the destination AP device is configured to store the received physical and network address information in the table of the destination AP device,
   after sending back to the destination AP device the physical and network address information, the source AP device is configured to transmit network address information of the terminal device, which is stored in the table of the source AP device, to the destination AP device,
   when the destination AP device receives the network address information of the terminal device, which has been transmitted by the source AP device after sending back to the destination AP device the physical and network address information, the destination AP device is configured to transmit to the source AP device predetermined information including the physical address information of the terminal device, stored in the table of the destination AP device,
   when the source AP device receives the predetermined information, the source AP device is configured to determine whether storing of the connection information of the terminal device in the table of the destination AP device is completed, and to delete the connection information stored in the table of the source AP device when it is determined that the storing is completed,
   the destination AP device is configured to transmit to the source AP device a Proxy address resolution protocol (ARP) request, the Proxy ARP request including said physical address information of the terminal as source physical address information of the Proxy ARP request and broadcast address information as destination physical address information of the Proxy ARP request,
   the source AP device is configured to receive the Proxy ARP request, look up the table of the source AP device with the physical address information of the terminal included in the received Proxy APR request, and then send back to the destination AP device Proxy ARP data corresponding to physical and network address information of the terminal device, when the Proxy ARP data corresponding to physical and network address information of the terminal device exist in the table of the source AP device,
   when the destination AP device receives from the source AP device the Proxy ARP data corresponding to the physical and network address information of the terminal device, the destination AP device is configured to store the received Proxy ARP data in the table of the destination AP device,
   after sending back the Proxy ARP data to the destination AP device, the source AP device is configured to transmit a further ARP request to the destination AP device, the further ARP request including broadcast address information as destination physical address information of the further ARP request, media access control (MAC) address information of the destination AP device as source physical address information of the further ARP request, and the network address information of the terminal device, which is stored in the table of the source AP device, as destination network address information of the further ARP request,
   when the destination AP device receives the further ARP request, the destination AP device is configured to transmit to the source AP device an ARP reply including the physical address information of the terminal device, stored in the table of the destination AP device, and
   when the source AP device receives the ARP reply, the source AP device is configured to determine whether storing of the connection information of the terminal device in the table of the destination AP device is completed, and to delete, when it is determined that the storing is completed, from the table of the source AP device the Proxy ARP data corresponding to the physical address information of the terminal device included in the ARP reply as the connection information stored in the table of the source AP device.

2. An access point (AP) device as a destination AP device of a handover, which communicates, with a plurality of APs, the destination AP device comprising:
   a transceiver for communicating with other AP devices through a network switcher;
   a wireless interface for communicating with a wireless terminal device of a mobile unit over a radio channel;
   a table for storing connection information of the terminal device, the connection information including physical address information and network address information of the terminal device; and
   a controller for controlling transmission and reception, and storing in and deleting from the table the connection information of the terminal device,
   wherein
   the terminal device is configured to hand over device from a source AP device to the destination AP device,
   when the terminal device hands over from the source AP device to the destination AP device, the destination AP device is configured to:
   transmit physical address information of the terminal device to the source AP device;

receive physical and network address information of the terminal device from the source AP device to store the received information in the table as the connection information; and in response to network address information of the terminal device, which has been transmitted by the source AP device after sending to the destination AP device the physical and network address information, transmit to the source AP device predetermined information including the physical address information of the terminal device, which is stored in the table, so that the source AP device determines whether to delete the connection information stored in the source AP device based on the predetermined information, and the destination AP device, when the terminal device hands over from the source AP device to the destination AP device, is configured to:

transmit to the source AP device a Proxy address resolution protocol (ARP) request, the Proxy ARP request including said physical address information of the terminal as source physical address information of the Proxy ARP request and broadcast address information as destination physical address information of the Proxy ARP request;

receive from the source AP device Proxy ARP data corresponding to the physical and network address information of the terminal device to store the received Proxy ARP data in the table as the connection information, when the Proxy ARP data corresponding to the physical and network address information of the terminal device exist in a table of the source AP device;

receive from the source AP device a further ARP request including broadcast address information as destination physical address information of the further ARP request, media access control (MAC) address information of the destination AP device as source physical address information of the further ARP request, and the network address information of the terminal device, which is stored in the table of the source AP device, as destination network address information of the further ARP request, the further ARP request having been transmitted by the source AP device after sending the Proxy ARP data to the destination AP device; and in response to the received further ARP request, transmit to the source AP device an ARP reply including the physical address information of the terminal device, which is stored in the table, so that the source AP device receives the ARP reply and determines, based on the received ARP reply, whether to delete the Proxy ARP data corresponding to the physical address information of the terminal device included in the ARP reply as the connection information stored in the source AP device.

3. An access point as a source AP device of a handover, which communicates with a plurality of APs, the source AP device comprising:

a transceiver for communicating with other AP devices through a network switcher;

a wireless interface for communicating with a wireless terminal device of a mobile unit over a radio channel;

a table for storing connection information of the terminal device, the connection information including physical address information and network address information of the terminal device; and a controller for controlling transmission and reception, and storing in and deleting from the table the connection information of the terminal device, wherein the terminal device is configured to hand over from the source AP device to a destination AP device, when the terminal device hands over from the source AP device to the destination AP device, the source AP device is configured to:

receive physical address information of the terminal device from the destination AP device, and look up the table with the received physical address information to send back physical and network address information of the terminal device, which is stored in the table, to the destination AP device, transmit, after sending back the physical and network address information to the destination AP device, network address information of the terminal device, which is stored in the table, to the destination AP device; and determine, in response to predetermined information including physical address information of the terminal device received from the destination AP device, based on the received predetermined information whether storing of the connection information of the terminal device is completed at the destination AP device, and delete the connection information stored in the table when it is determined that the storing is completed, and the source AP device, when the terminal device hands over from the source AP device to the destination AP device, is configured to:

receive from the destination AP device Proxy ARP request including physical address information of the terminal as source physical address information of the Proxy ARP request and broadcast address information as destination physical address information of the Proxy ARP request physical, and look up the table with the physical address information of the terminal included in the received Proxy ARP request to send back to the destination AP device Proxy ARP data corresponding to the physical and network address information of the terminal device, when the Proxy ARP data corresponding to the physical and network address information of the terminal device exist in the table, transmit, after sending back the Proxy ARP data to the destination AP device, a further ARP request to the destination AP device, the further ARP request including broadcast address information as destination physical address information of the further ARP request, media access control (MAC) address information of the destination AP device as source physical address information of the further ARP request, and the network address information of the terminal device, which is stored in the table, as destination network address information of the further ARP request; and receive an ARP reply including the physical address information of the terminal device, determine, in response to the received ARP reply and based on the received ARP reply, whether storing of the connection information of the terminal device in a table of the destination AP device is completed, and to delete, when it is determined that the storing is completed, from the table of the source AP device the Proxy ARP data corresponding to the physical address information of the terminal device included in the ARP reply as the connection information stored in the table of the source AP device.

4. A communication method of a communications system having a plurality of access point (AP) devices and a network switcher to communicate with a wireless terminal device of a mobile unit, in which the terminal device hands over from a source AP device to a destination AP device, and each of the plurality of AP device includes a transceiver for communicating with other AP devices through the network switcher, a wireless interface for communicating with the terminal device over a radio channel, a table for storing connection information including physical address information and network address information of the terminal device, and a controller for controlling transmission and reception, and storing in and deleting from the table connection information of the terminal device, the method comprising:

transmitting by the determination AP device, when the terminal device hands over from the source AP device to the destination AP device, physical address information of the terminal device to the source AP device;

receiving by the source AP device the physical address information of the terminal device to look up the table of the source AP device with the received physical address information and sending back by the source AP device physical and network address information of the terminal device, which is stored in the table of the source AP device, to the destination AP device;

receiving by the destination AP device the physical and network address information of the terminal device from the source AP device to store the received information in the table of the destination AP device as the connection information of the terminal device;

transmitting by the source AP device, after sending back the physical and network address information of the terminal device to the destination AP device, network address information of the terminal device, which is stored in the table of the source AP device, to the destination AP device;

receiving by the destination AP device the network address information of the terminal device, which has been transmitted by the source AP device after sending back to the destination AP device the physical and network address information, to transmit predetermined information including the physical address information of the terminal device, which is stored in the table of the destination AP device, to the source AP device; and receiving by the source AP device the predetermined information, determining based on the received predetermined information whether storing of the connection information of the terminal device is completed at the destination AP device and deleting the connection information stored in the table of the source AP device when it is determined that the storing is completed, wherein the transmitting by the destination AP device the physical address information of the terminal device includes transmitting by the destination AP device to the source AP device a Proxy address resolution protocol (ARP) request including said physical address information of the terminal as source physical address information of the Proxy ARP request and broadcast address information as destination physical address information of the Proxy ARP request, the receiving by the source AP device the physical address information of the terminal device includes receiving by the source AP device the Proxy ARP request, looking up the table of the source AP device with the physical address information of the terminal included in the received Proxy ARP request, and then sending back to the destination AP device Proxy ARP data corresponding to the physical and network address information of the terminal device, when the Proxy ARP data corresponding to the physical and network address information of the terminal device exist in the table of the source AP device, the receiving by the destination AP device the physical and network address information of the terminal device includes storing by the destination AP device, when the destination AP device receives from the source AP device the Proxy ARP data corresponding to the physical and network address information of the terminal device, the received Proxy ARP data in the table of the destination AP device, the transmitting by the source AP device the network address information of the terminal device includes transmitting by the source AP device, after sending back to the destination AP device the Proxy ARP data, to the destination AP device a further ARP request including broadcast address information as destination physical address information of the further ARP request, media access control (MAC) address information of the destination AP device as source physical address information of the further ARP request, and the network address information of the terminal device, which is stored in the table of the source AP device, as destination network address information of the further ARP request, the receiving by the destination AP device the network address information of the terminal device includes transmitting by the destination AP device, when the destination AP device receives the further ARP request, to the source AP device an ARP reply including the physical address information of the terminal device, stored in the table of the destination AP device, and the receiving by the source AP device the predetermined information includes determining by the source AP device, when the source AP device receives the ARP reply, whether storing of the connection information of the terminal device in the table of the destination AP device is completed, and deleting, when it is determined that the storing is completed, from the table of the source AP device the Proxy ARP data corresponding to the physical address information of the terminal device included in the ARP reply as the connection information stored in the table of the source AP device.

5. A communication method of an access point (AP) device as a destination AP device of a handover, which communicates with a plurality of APs and a wireless terminal device of a mobile unit, the destination AP including a transceiver for communicating with other AP devices through the network switcher, a wireless interface for communicating with the terminal device over a radio channel, a table for storing connection information of the terminal device, the connection information including physical address information and network address information of the terminal device, and a controller for controlling transmission and reception, and storing in and deleting from the table the connection information of the terminal device, the wireless terminal device handing over from a source AP device to the destination AP device, the method comprising:

transmitting, when the terminal device hands over from the source AP device to the destination AP device, physical address information of the terminal device to the source AP device;

receiving physical and network address information of the terminal device supplied from the source AP device to store the received information in the table as the connection information of the terminal device; and receiving network address information of the terminal device, which has been transmitted by the source AP device after sending to the destination AP device the physical and network address information, and transmitting predetermined information including the physical address information of the terminal device, which is stored in the table, to the source AP device, so that the source AP device determines whether to delete the connection information stored in the source AP device based on the predetermined information, wherein the transmitting the physical address information of the terminal device includes transmitting to the source AP device a Proxy address resolution protocol (ARP) request including said physical address information of the terminal as source physical address information of the Proxy ARP request and broadcast address information as destination physical address information of the Proxy ARP request;

the receiving the physical and network address information of the terminal device includes receiving from the source AP device Proxy ARP data corresponding to the physical and network address information of the terminal device to store the received Proxy ARP data in the table of the destination AP device as the connection information, when the Proxy ARP data corresponding to the physical and network address information of the terminal device exist in the table of the source AP device; and the receiving the network address information of the terminal device includes:

receiving from the source AP device a further ARP request including broadcast address information as destination physical address information of the further ARP request, media access control (MAC) address information of the destination AP device as source physical address information of the further ARP request, and the network address information of the terminal device, which is stored in the table of the source AP device, as destination network address information of the further ARP request, the further ARP request having been transmitted by the source AP device after sending the Proxy ARP data to the destination AP device, and in response to the received further ARP request, transmitting to the source AP device an ARP reply including the physical address information of the terminal device, which is stored in the table of the destination AP device, so that the source AP device receives the ARP reply and determines, based on the received ARP reply, whether to delete the Proxy ARP data corresponding to the physical address information of the terminal device included in the ARP reply as the connection information stored in the source AP device.

6. A communication method of an access point (AP) device as a source AP device of a handover, which communicates with a plurality of APs and a wireless terminal device of a mobile unit, the source AP including a transceiver for communicating with the other AP devices through the network switcher, a wireless interface for communicating with the terminal device over a radio channel, a table for storing connection information of the terminal device, the connection information including physical address information and network address information of the terminal device, and a controller for controlling transmission and reception, and storing in and deleting from the table the connection information the terminal device, the wireless terminal device handing over from the source AP device to a destination AP device, the method comprising:

receiving physical address information of the terminal device from the destination AP to look up the table with the received physical address information and sending back physical and network address information of the terminal device, which is stored in the table, to the destination AP device;

transmitting, after sending back the physical and network address information to the destination AP device, network address information of the terminal device, which is stored in the table, to the destination AP device; and receiving predetermined information supplied from the destination AP device, and determining based on the received predetermined information whether storing of the connection information of the terminal device is completed at the destination AP device and delete the connection information stored in the table when it is determined that the storing is completed, wherein the receiving physical address information of the terminal device includes receiving from the destination AP device Proxy address resolution protocol (ARP) request including physical address information of the terminal as source physical address information of the Proxy ARP request and broadcast address information as destination physical address information of the Proxy ARP request physical address information of the terminal device, and looking up the table of the source AP device with the physical address information of the terminal included in the received Proxy ARP request to send back to the destination AP device Proxy ARP data corresponding to the physical and network address information of the terminal device, when the Proxy ARP data corresponding to the physical and network address information of the terminal device exist in the table of the source AP device, the transmitting the network address information of the terminal device includes transmitting, after sending back the Proxy ARP data to the destination AP device, a further ARP request to the destination AP device, the further ARP request including broadcast address information as destination physical address information of the further ARP request, media access control (MAC) address information of the destination AP device as source physical address information of the further ARP request, and the network address information of the terminal device, which is stored in the table of the source AP device, as destination network address information of the further ARP request; and the receiving the predetermined information includes receiving an ARP reply including the physical address information of the terminal device, determining, in response to the received ARP reply and based on the received ARP reply, whether storing of the connection information of the terminal device in the table of the destination AP device is completed, and deleting, when it is determined that the storing is completed, from the table of the source AP device the Proxy ARP data corresponding to the physical address information of the terminal device included in the ARP reply as the connection information stored in the table of the source AP device.

* * * * *